(12) United States Patent
Wong et al.

(10) Patent No.: US 9,396,159 B2
(45) Date of Patent: *Jul. 19, 2016

(54) SIMPLE, RELIABLE, CONNECTIONLESS COMMUNICATION MECHANISM

(75) Inventors: Michael K. Wong, Cupertino, CA (US); Rabin A. Sugumar, Sunnyvale, CA (US); Stephen E. Phillips, Los Gatos, CA (US); Hugh Kurth, Lexington, MA (US); Suraj Sudhir, Sunnyvale, CA (US); Jochen Behrens, Santa Cruz, CA (US)

(73) Assignee: Oracle America, Inc., Redwood City, CA (US)

( * ) Notice: Subject to any disclaimer, the term of this patent is extended or adjusted under 35 U.S.C. 154(b) by 1604 days.

This patent is subject to a terminal disclaimer.

(21) Appl. No.: 11/860,914

(22) Filed: Sep. 25, 2007

(65) Prior Publication Data

US 2009/0080439 A1 Mar. 26, 2009

(51) Int. Cl.
*H04L 12/28* (2006.01)
*G06F 15/173* (2006.01)

(52) U.S. Cl.
CPC .............................. *G06F 15/17356* (2013.01)

(58) Field of Classification Search
USPC ............. 370/412, 469, 392; 709/250; 710/31, 710/36, 48, 316; 719/313; 726/22
See application file for complete search history.

(56) References Cited

U.S. PATENT DOCUMENTS

| | | | |
|---|---|---|---|
| 5,644,784 A | 7/1997 | Peek | |
| 6,782,465 B1 | 8/2004 | Schmidt | |
| 6,868,458 B2 | 3/2005 | Kim | |
| 6,976,174 B2 * | 12/2005 | Terrell et al. | 726/22 |
| 7,103,888 B1 * | 9/2006 | Cayton et al. | 719/313 |
| 7,496,095 B1 * | 2/2009 | Davis | 370/392 |
| 2001/0049755 A1 | 12/2001 | Kagan et al. | |
| 2002/0161943 A1 | 10/2002 | Kim | |
| 2002/0165897 A1 | 11/2002 | Kagan et al. | |
| 2004/0037319 A1 * | 2/2004 | Pandya | 370/469 |
| 2005/0091334 A1 | 4/2005 | Chen et al. | |
| 2005/0138242 A1 * | 6/2005 | Pope et al. | 710/48 |
| 2005/0177657 A1 * | 8/2005 | Pope et al. | 710/36 |
| 2006/0045099 A1 | 3/2006 | Chang et al. | |
| 2006/0161696 A1 | 7/2006 | Anjo et al. | |
| 2006/0218336 A1 * | 9/2006 | Ishizawa et al. | 710/316 |
| 2006/0253619 A1 * | 11/2006 | Torudbakken et al. | 710/31 |
| 2007/0266179 A1 * | 11/2007 | Chavan et al. | 709/250 |
| 2009/0222598 A1 | 9/2009 | Hayden | |

OTHER PUBLICATIONS

Office Action in U.S. Appl. No. 11/860,934 as mailed Oct. 29, 2009.
Office Action in U.S. Appl. No. 11/860,934 as mailed May 27, 2010.

* cited by examiner

*Primary Examiner* — Dang Ton
*Assistant Examiner* — Lionel Preval
(74) *Attorney, Agent, or Firm* — Brooks Kushman P.C.

(57) ABSTRACT

A server interconnect system includes a first server node operable to send and receive messages and a second server nodes operable to send and receive messages. The system further comprises a first interface unit in communication with the first server node and a second interface unit in communication with the second server node. The first interface unit has a first set of message send registers and a first set of message receive registers. Similarly, the second interface unit has a second set of message send registers and a second set of message receive registers. The server interconnect system also includes a communication switch that receives and routes a message from the first or second server nodes when either of the first or second registers indicates that a valid message is ready to be sent. A method implemented by the server interconnect system is also provided.

5 Claims, 6 Drawing Sheets

SIMPLE, RELIABLE, CONNECTIONLESS COMMUNICATION MECHANISM

BACKGROUND OF THE INVENTION

1. Field of the Invention

In at least one aspect, the present invention relates to communication within a cluster of computer nodes.

2. Background Art

A computer cluster is a group of closely interacting computer nodes operating in a manner so that they may be viewed as though they are a single computer. Typically, the component computer nodes are interconnected through fast local area networks. Internode cluster communication is typically accomplished through a protocol such as TCP/IP or UDP/IP running over an ethernet link, or a protocol such as uDAPL or IPoIB running over an Infiniband ("IB") link. Computer clusters offer cost effective improvements for many tasks as compared to using a single computer. However, for optimal performance, low latency cluster communication is an important feature of many multi-server computer systems. In particular, low latency is extremely desirable for horizontally scaled databases and for high performance computer ("HPC") systems.

Although present day cluster technology works reasonably well, there are a number of opportunities for performance improvements regarding the utilized hardware and software. For example, ethernet does not support multiple hardware channels with user processes having to go through software layers in the kernel to access the ethernet link. Kernel software performs the mux/demux between user processes and hardware. Furthermore, ethernet is typically an unreliable communication link. The ethernet communication fabric is allowed to drop packets without informing the source node or the destination node. The overhead of doing the mux/demux in software (trap to the operating system and multiple software layers) and the overhead of supporting reliability in software result in significant negative impact on application performance.

Similarly, Infiniband ("IB") offers several additional opportunities for improvement. IB defines several modes of operation including Reliable Connection, Reliable Datagram, Unreliable Connection, and Unreliable Datagram. Each communication channel utilized in IB Reliable Datagrams requires the management of at least three different queues. Commands are entered into send or receive work queues. Completion notification is realized through a separate completion queue. Asynchronous completion results in significant overhead. When a transfer has been completed, the completion ID is hashed to retrieve context to service the completion. In IB, receive queue entries contain a pointer to the buffer instead of the buffer itself resulting in buffer management overhead. Moreover, send and receive queues are tightly associated with each other Implementations cannot support scenarios such as multiple send channels for one process, and multiple receive channels for others, which is useful in some cases. Finally, reliable datagram is implemented as a reliable connection in hardware, and the hardware does the muxing and demuxing based on the end-to-end-context provided by the user. Therefore, IB is not truly connectionless and results in a more complex implementation.

Accordingly, there exists a need for improved methods and systems for connectionless internode cluster communication.

SUMMARY OF THE INVENTION

The present invention solves one or more problems of the prior art by providing in at least one embodiment, a server interconnect system providing communication within a cluster of computer nodes. The server interconnect system includes a first server node operable to send and receive messages and a second server node operable to send and receive messages. The system further comprises a first interface unit in communication with the first server node and a second interface unit in communication with the second server node. The first interface unit has a first set of message send registers and a first set of message receive registers. Similarly, the second interface unit has a second set of message send registers and a second set of message receive registers. The server interconnect system also includes a communication switch that receives and routes a message from the first or second server nodes when either of the first or second registers indicates that a valid message is ready to be sent. Advantageously, the server interconnect system of the present embodiment is reliable and connectionless while supporting messaging between the nodes. The server interconnect system is reliable in the sense that packets are never dropped other than in catastrophic situations such as hardware failure. The server interconnect system is connectionless in the sense that hardware treats each transfer independently, with specified data moved between the nodes and queue/memory addresses specified for the transfer. Moreover, there is no requirement to perform a handshake before communication starts or to maintain status information between pairs of communicating entities. Latency characteristics of the present embodiment are also found to be superior over the prior art methods.

In another embodiment of the present invention, a method of sending a message from a source server node to a target server node via associated interface units and a communications switch is provided. The method of this embodiment comprises providing a message to the system memory of the source server node. Send message information is written into an assigned send doorbell register located within a source interface unit. The send message information includes a pointer to a buffer placed in a SEND_ADDR field, the size of the message placed in a SEND_SIZE field, the target server node identification placed in a TARGET_NODE field, and the receive queue identification placed in a TARGET_QID field. A corresponding send status register located in the source interface unit is set to a pending state. The target node identification, receive queue identification, and message content are transferred to a server switch. The message is then routed to the second server node.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
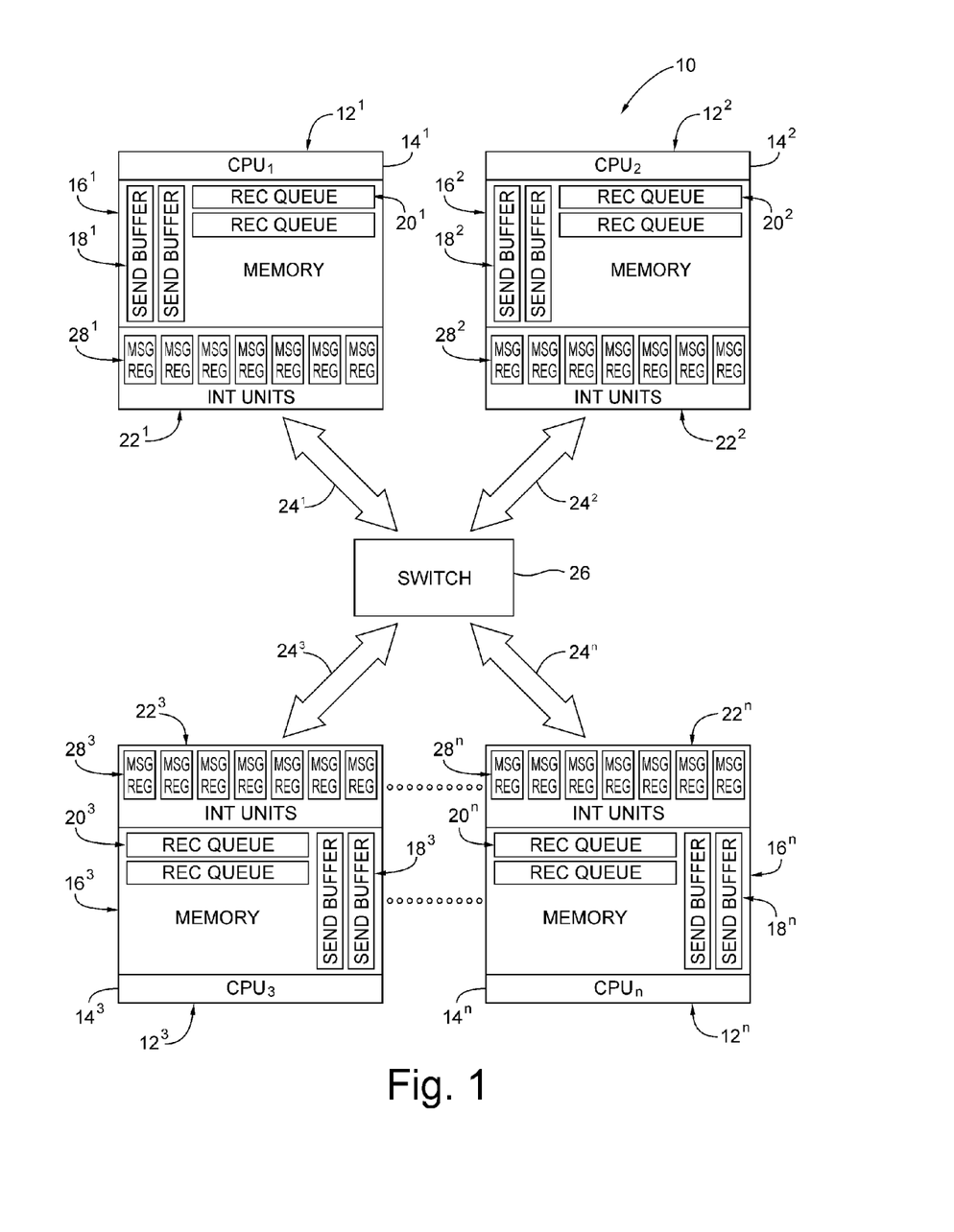
FIG. 1 is a schematic illustration of an embodiment of a server interconnect system.

With reference to FIG. 1, a schematic illustration of an embodiment of a server interconnect system for communication within a cluster of computer nodes is provided. Server interconnect system 10 includes server nodes 12$^n$. Since the system of the present invention typically includes a plurality of nodes (i.e., n nodes as used herein), the superscript n which can be used to refer to the configuration of a typical node with associated hardware. Each of server nodes 12$^n$ includes CPU 14$^n$ and system memory 16$^n$. System memory 16$^n$ includes send buffers 18$^n$ and receive queues 20$^n$. In the present embodiment, messaging is initiated by writes to doorbell registers implemented in hardware as set forth below. The content of the write specifies the source node and address, and the destination node and queue. Multiple doorbell registers are defined for each node. The doorbell registers are advantageously mapped into user processes. Messaging may be initiated at the user level. Interface units 22$^n$ are associated with server nodes 12$^n$. Interface units 22$^n$ are in communication via communication links 24$^n$ to server communication switch 26. In a variation of the present embodiment, the server interconnect system is used to connect multiple servers through a PCI-Express fabric. Moreover, in one refinement of the present embodiment, interface units 22$^n$ and server communication switch 26 are implemented as separate chips. In another refinement of the present embodiment, interface units 22$^n$ and server communication switch 26 are both located within a single chip.

Figure 2:
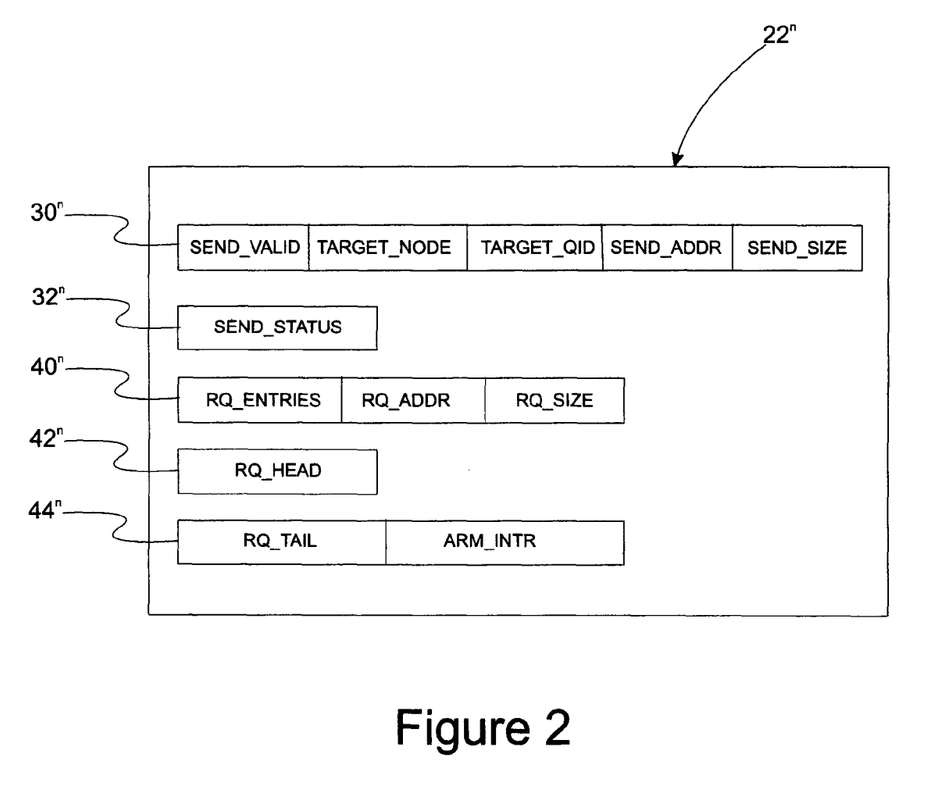
FIG. 2 is a schematic illustration of an embodiment of a interface unit used in server interconnect systems.
Figure 3A:
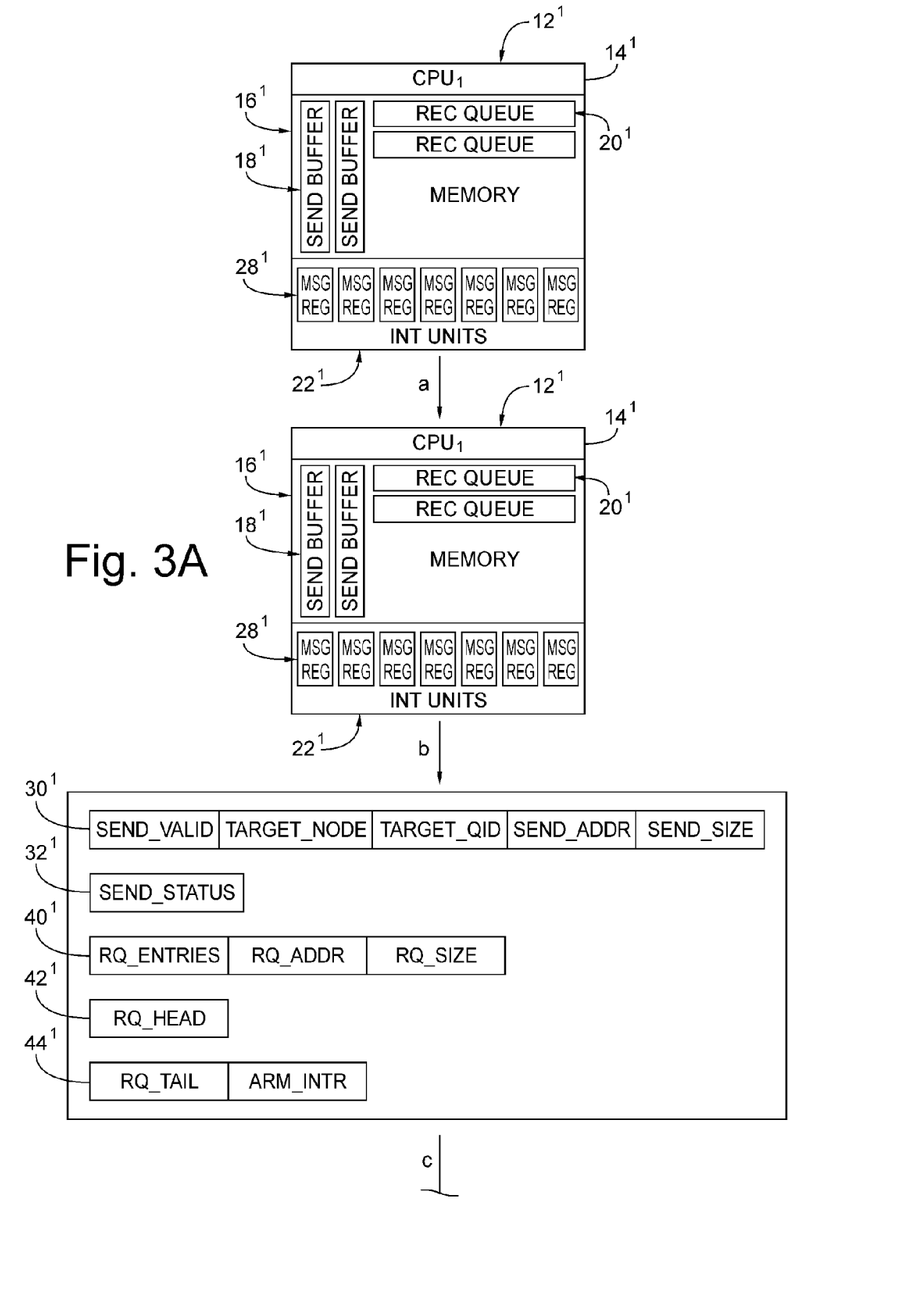
FIGS. 3A, B, C and D provide a flowchart of a method for transferring messages between server nodes.
Figure 3B:
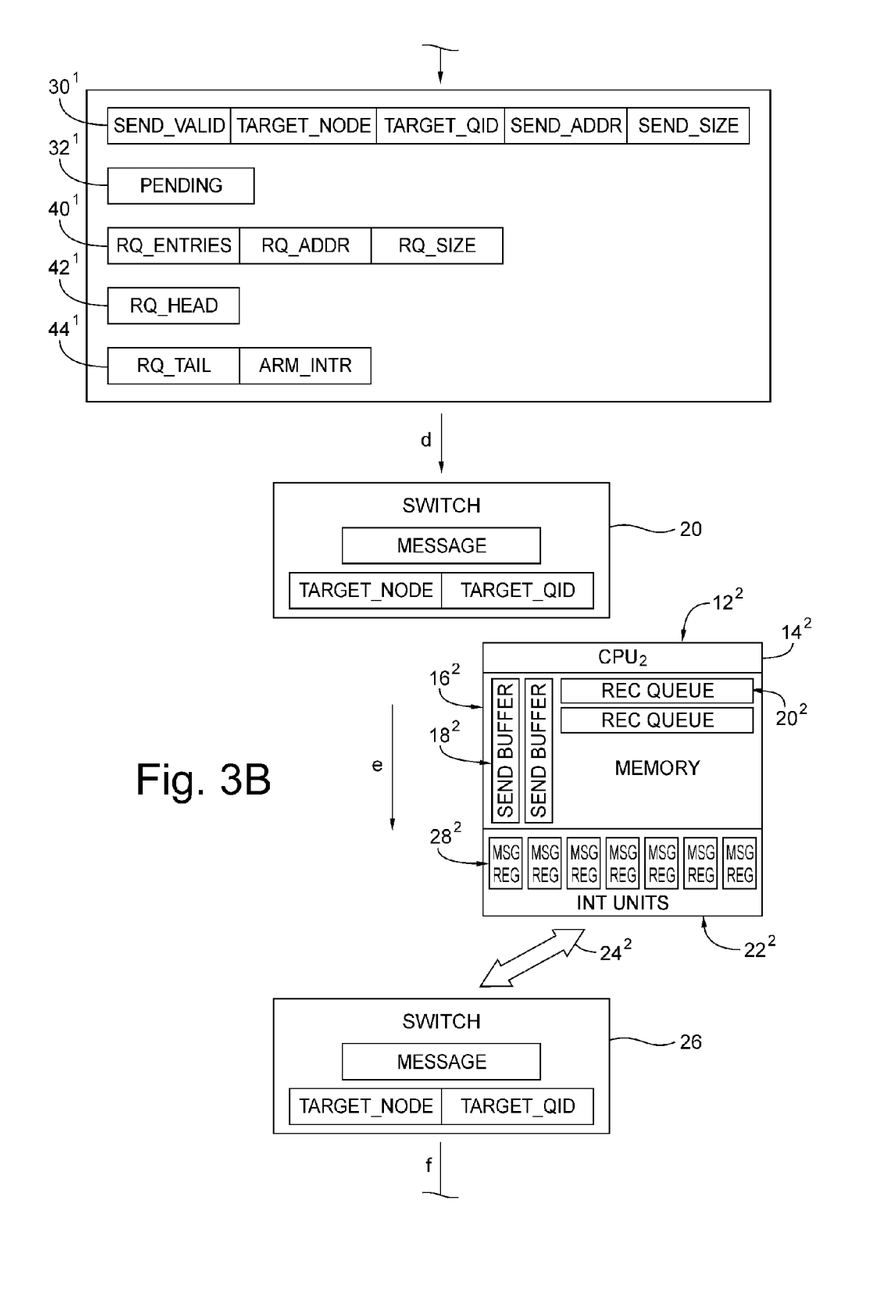
Figure 3C:
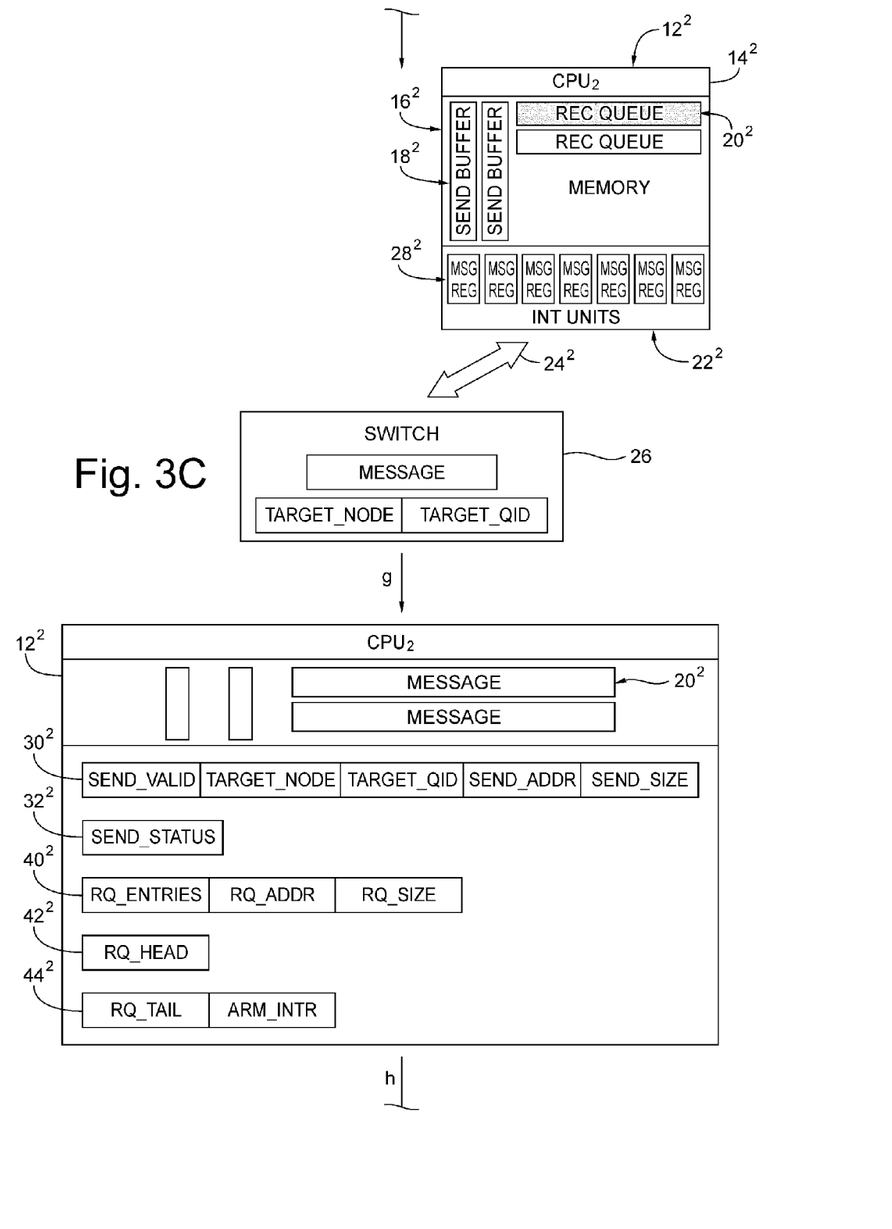
Figure 3D:
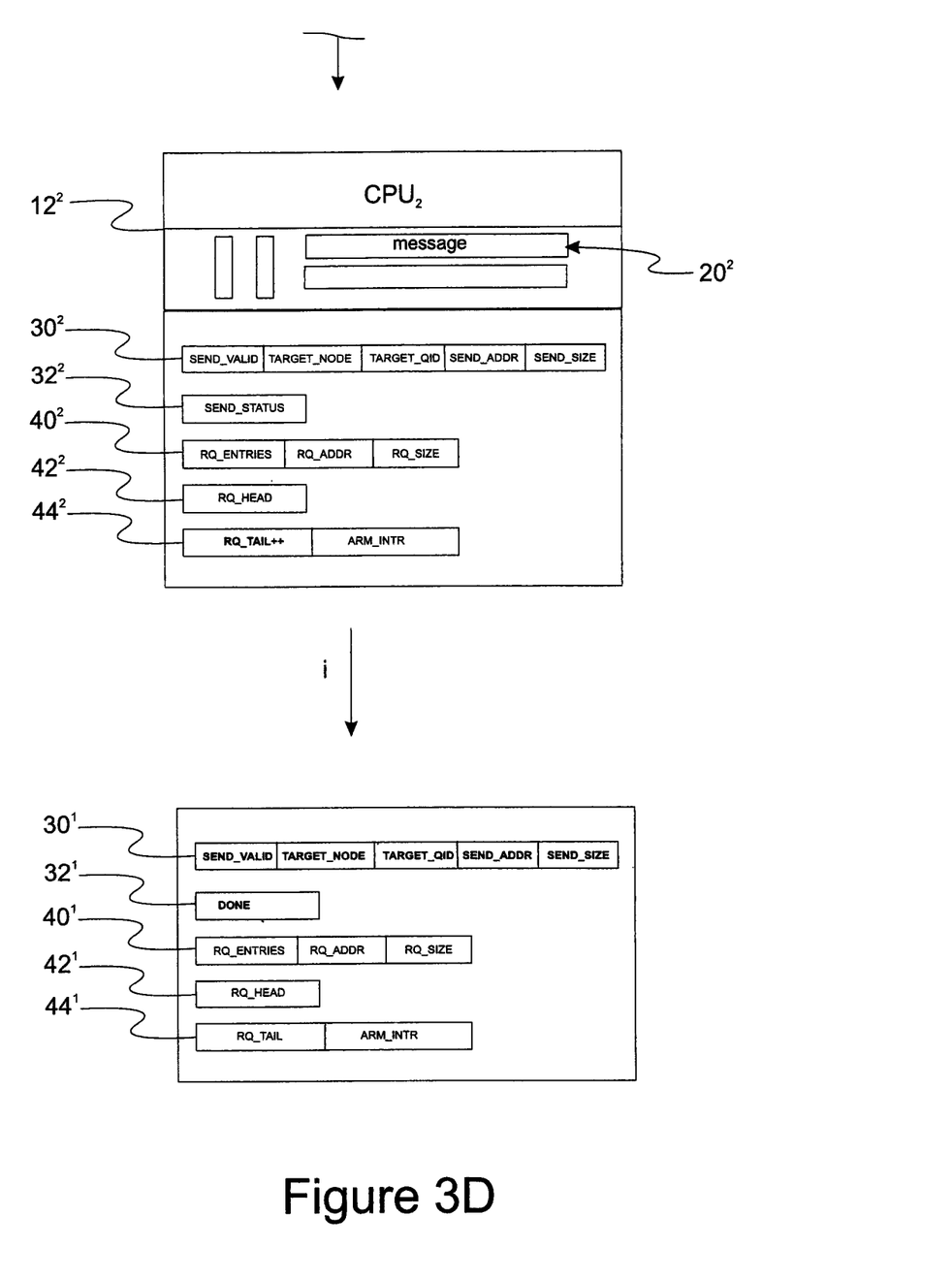

With reference to FIGS. 1 and 2, the utilization of a plurality of message registers to send and receive messages is illustrated. FIG. 2 is a schematic illustration of an embodiment of a interface unit used in server interconnect systems. Server nodes 12$^n$ are associated with a set of message registers. Set of message registers 28$^n$ are located within interface unit 22$^n$ and are associated with server node 12$^n$. FIG. 2 provides a schematic illustration of the disposition of message registers in interface unit 22$^n$. Interface unit 22$^n$ includes a set of message send registers and a set of message receive registers. The set of message send registers include send doorbell register 30$^n$ that is used to initiate a message transfer. In one variation, send doorbell register 30$^n$ includes the fields provided in Table 1. The sizes of these fields are only illustrative of an example of send doorbell register 30$^n$.

TABLE 1

Send doorbell register fields

| Field | Description |
|---|---|
| SEND_VALID | 1 bit |
| TARGET_NODE | N bits (where $2^N$ is the number of servers in the cluster) |
| TARGET_QID | M bits (where $2^M$ is the number of receive queues per server) |
| SEND_ADDR | ~32 bits (location of buffer that contains message to be sent) |
| SEND_SIZE | Size of message |

The set of message send registers also includes send status register 32. Send status register 32$^n$ is associated with doorbell register 30$^n$. Send status register 32$^n$ contains the status of the message send initiated through a write into send doorbell register 30$^n$. In a variation, send status register 32$^n$ includes at least one field as set forth in Table 2. The size of this field is only illustrative of an example of send status register 32$^n$.

TABLE 2

Send status register field

| Field | Description |
|---|---|
| SEND_STATUS | ~8 bits (status of send: pending, done, error, type of error) |

Software encoded in computer readable media and executing on server node 12$^n$ allocates a receive queue to receive messages in system memory. The set of message receive registers includes receive queue configuration register 40$^n$. Receive queue configuration register 40$^n$ is used by the executing software to describe the receive queue structure to hardware. Fields in receive queue configuration register 40$^n$ include one or more of the fields set forth in Table 3. The sizes of these fields are only illustrative of an example of receive queue configuration register 40$^n$.

TABLE 3

Receive queue configuration register fields.

| Field | Description |
|---|---|
| RQ_ENTRIES | ~10 bits (Size of receive queue) |
| RQ_ADDR | ~32 bits (Base address of receive queue) |
| RQ_SIZE | ~12 bits (Size of each receive queue entry) |

Receive queue control register 42$^n$ is associated with receive queue configuration register 40$^n$. Receive queue control register 42$^n$ includes at least one field as set forth in Table 4. The size of this field is only illustrative of an example of receive queue control register 42$^n$.

TABLE 4

Receive queue control register fields.

| Field | Description |
|---|---|
| RQ_HEAD | ~10 bits (pointer to most recently processed receive queue entry) |

Receive queue status register 44$^n$ is also associated with receive queue configuration register 40$^n$. Receive queue status register $44''$ holds the current status of the receive queue. Fields in receive queue status register $44''$ include one or more of the fields set forth in Table 5. The sizes of these fields are only illustrative of an example of receive queue status register $44''$.

TABLE 5

Receive queue status register fields.

| Field | Description |
|---|---|
| RQ_TAIL | ~10 bits (pointer to receive queue entry to be written next) |
| ARM_INTR | 1 bit (when set, server is interrupted on arrival of a message) |

Each of interface units $14''$ typically contain a large number of send and receive registers (i.e., on the order of a 1000 or more). Each software process/thread on a server that wishes to send data to another server is allocated a send doorbell register and an associated send status register. Each software process that wishes to receive messages from another server is allocated a receive queue configuration register and an associated receive queue status register.

With reference to FIGS. 1, 2, and 3A-D, an example of communication utilizing the server interconnect system set forth above is provided. FIGS. 3A-D, provide a flowchart of a method for transferring messages between server nodes. In this example, communication is between source server node $12^1$ and target server node $12^2$. Executing software writes a message into buffer $18^1$ in system memory associated with source server node $12''$ as indicated in step a). In this example, server node $12''$ and interface unit $22^1$ are the "send side" and server node $12^2$ and interface unit $22^2$ are the "receive side." Software then writes in step b) a valid word into the assigned send doorbell register $30''$ with a pointer to buffer $18''$ placed in the SEND_ADDR field, the size of the message placed in the SEND_SIZE field, the target server node id placed in the TARGET_NODE field, and the receive queue id placed in the TARGET_QID. The valid bit is used by hardware to determine if software is providing a valid doorbell for processing. In a variation, hardware may also assume an implicit valid when it receives a doorbell write, but we just chose to include an explicit valid bit set by software. When hardware in interface unit $22^1$ detects a valid doorbell, it sets the corresponding send status register to the pending state by writing the corresponding message to the SEND_STATUS field in step c). In step d), hardware then performs a DMA read to get the contents of the message from system memory, and sends it to the server communication switch 26, along with the target node id and receive queue id. Server communication switch 26 routes the message to target server node $12^2$.

Target interface unit $22^2$ at the target server $12^2$ uses the receive queue id to identify the targeted receive queue in step f). A DMA write is then performed to deposit the message in receive queue $20^2$ pointed to by the tail pointer of the receive queue status register in step g). Target interface unit $22^2$ unit then increments RQ_TAIL in the receive queue status register $44^2$ in step h), and sends an acknowledgment ("ack") back to the source interface unit $22^1$. When source interface unit $14^1$ receives the ack, it updates the SEND_STATUS field in send status register $32^1$ to 'done' as shown in step i). When errors occur, or if the receive queue is full, target interface unit $22^2$ sends an error message back to source interface unit $22^1$. Depending on the type of error, source interface unit $22^1$ either does a retry (sends message again), or discards the message and sets the SEND_STATUS field to indicate the error. Communication is reliable in the absence of unrecoverable hardware failure. When ARM_INTR is set the receiving server is interrupted as set forth above. ARM_INTR provides a way for software to tell messaging hardware if it (software) is waiting for an interrupt on message arrival.

Executing software on the send side polls the send status register $32^1$. When a status change from 'pending' to 'done' or 'error' is detected, the appropriate action is taken. Executing software on the receive side polls the receive queue status register $44^2$. When an incrementing of the tail pointer is sensed, target sever node $12^2$ detects the arrival of a new message. Target server node $12^2$ proceeds to process the message. Optionally, the receive side could also wait for an interrupt when a message arrives. Once processing of an entry is completed, the RQ_HEAD field is updated in the receive queue control register to inform hardware that the corresponding queue entry is now available for a new message. In this context, hardware refers to hardware processing the receive queue. It should be appreciated that in at least one variation, the receive queue is a ring, and has a certain number of entries (Table 3: RQ_ENTRIES). Hardware adds new messages at the tail and increments the tail pointer (to tell software that a new message is available). Software processes messages at the head and increments head pointer (to tell hardware that a message has been processed, the corresponding entry is available). When all entries in a receive queue are full and a new message arrives, receiving hardware sends a queue full error message instead of an ack.

In a variation of the present embodiment, sockets are utilized to effect message transferring. As used herein, the term "socket" refers to a software object (e.g., application programming interfaces ("API")) that connects an application to a network protocol. In a refinement of this variation, datagrams are used for communication between the server nodes. Datagrams utilize data packets for such communication. In a further refinement of this variation, this communication is connectionless. The implementation of socket datagrams used herein are reliable in the absence of hardware failure.

Referring to FIGS. 1 and 2, each server node $12''$ utilizes a driver that attaches to the associated interface unit $22''$. The driver controls all send and receive registers on interface units $22''$ and allocates them to user processes as needed. A user level socket library runs on top of the driver. The socket library is linked by an application executing on server node $12''$. The socket library is used by the application to communicate with other server nodes. The socket library converts socket API calls to interface units $22''$ to perform communication as described below.

In a refinement of the present application, four function calls are used herein in the socket datagram API. These function calls are set forth in Table 6.

TABLE 6

API function calls

| Function call | Description |
|---|---|
| socket | to open a socket |
| bind | to attach a known receive queue id to the socket |
| sendto/sendmsg | to send a message |
| recvfrom/recvmsg | to receive a message |

An 'open' on interface device $22''$ is performed to get a file descriptor to the interface device. Multiple 'mmap' calls are utilized to map a send doorbell register and an associated send status register, and a receive queue configuration register and an associated receive queue status register. Send buffers 18″ and receive queues 20″ are also allocated with the receive queue configuration register programmed as needed. A bind call is executed from a running socket by first checking if the bind requires the server to attach to a specific receive queue 20″. If so, an 'mmap' is performed to attach to the receive queue (if the receive queue is already taken it is an application error, and the appropriate error code is returned). If the bind does not specify a receive queue, the running socket just returns the ID of receive queue 20″ allocated earlier. To perform sendto or sendmsg, a running socket copies the message from the application provided buffer into the library send buffer allocated earlier. Send doorbell register 30″ is then written to thereby initiating message transfer to user address space. The running socket then waits for send status register 32″ to indicate that the message transfer is done or that an error has occurred. When the transfer is completed successfully, the number of bytes transferred is returned as the return value of the sendto/sendmsg function call. It should be appreciated that there are two levels of processing here. There is the user library, that manages the send doorbell and send status registers, and the application visible socket interface that works similar to software functions (subroutines) that take parameters and return a value on completion. When the transfer fails, an appropriate error code is returned to send status register 32″. To perform recvfrom or recvmsg, the running socket first checks if receive queue 20 is empty. If receive queue 20″ is not empty, the next valid message in receive queue 20 is copied into the application provided buffer. The number of bytes received is then returned. If receive queue 20″ is empty, the running socket may wait while polling the receive queue 20″. In a variation, interrupts are utilized to indicate to the operating system that a message has been transferred to receive queue 20″. Alternatively, if a non-blocking socket is utilized the appropriate error code is returned allowing the application to retry later.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A server interconnect system for sending a message, the system comprising:
   a first server node operable to send and receive messages, the first server node having a first receive queue;
   a second server node operable to send and receive messages, the second server node having a second receive queue;
   a first interface unit in communication with the first server node, the first interface unit having a first set of message registers, the first set of message registers including:
      a first send doorbell register, the first send doorbell register receiving information describing a message sent by the first server node including a target node and first server node send memory address;
      a first send status register, the first send status register receiving data regarding the status of a message sent by the first server node;
      a first receive queue configuration register, the first receive queue configuration register providing information regarding the first server node receive queue;
      a first receive queue control register, the first receive queue control register holding information regarding availability of the first receive queue; and
      a first receive queue status register, the first receive queue status register holding information regarding the current status of the first receive queue;
   a second interface unit in communication with the second server node, the second interface unit having a second set of message registers, the second set of message registers including:
      a second send doorbell register, the second send doorbell register receiving information describing a message sent by the second server node including a target node and second server node send memory address;
      a second send status register, the second send status register receiving data regarding the status of a message sent by the second server node;
      a second receive queue configuration register, the second receive queue configuration register providing information regarding the second server node receive queue;
      a second receive queue control register, the second receive queue control register holding information regarding availability of the second receive queue; and
      a second receive queue status register, the second receive queue status register holding information regarding the current status of the second receive queue;
   a communication switch, the communication switch being operable to receive and route a message from the first server node to the second receive queue and the second server node to the first receive queue when either the first or second send status registers indicate that a valid message has been sent, wherein each message specifies a target node and a receive queue identification via the first and second send doorbell registers without handshaking between the first and second server nodes before messaging begins to provide connectionless messaging between the first and second server nodes.

2. The server interconnect system of claim 1 operable to send and receive messages from the first and second server nodes by a DMA transfer.

3. The server interconnect system of claim 1 wherein the send doorbell register includes one or more fields selected from the group consisting of a SEND_VALID field, a TARGET_NODE field, a TARGET_QID field, a SEND_ADDR field, and a SEND_SIZE field.

4. The server interconnect system of claim 1 wherein the receive queue configuration register includes one or more fields selected from the group consisting of a RQ_ENTRIES field, a RQ_ADDR field, and a RQ_SIZE field.

5. The server interconnect system of claim 1 wherein the receive queue configuration register includes one or more fields selected from the group consisting of a RQ_TAIL field and a ARM_INTR field.

\* \* \* \* \*